Oct. 8, 1963
C. B. ESTES
3,106,141
VISUAL SIGNAL FOR PHOTOGRAPHIC CAMERAS
Filed Sept. 10, 1959
2 Sheets-Sheet 1
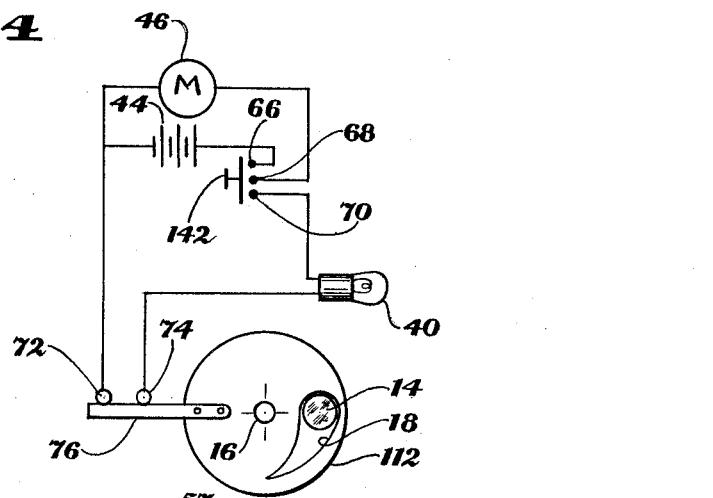
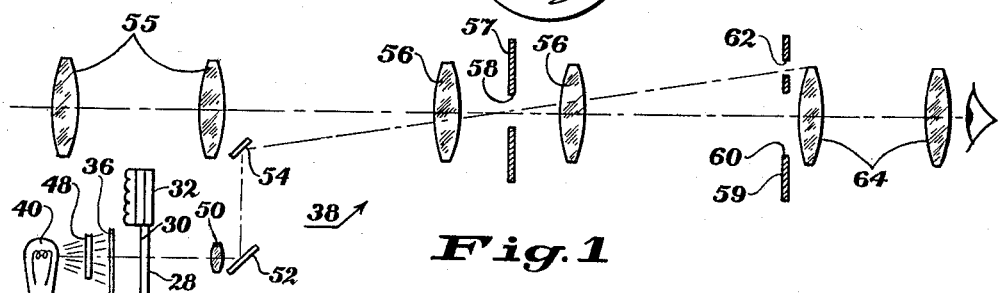
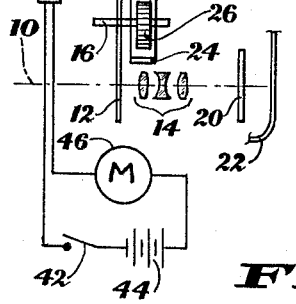
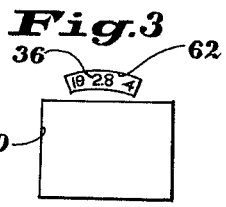
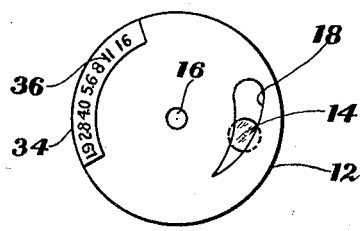
Cameron B. Estes
INVENTOR.
BY R. Frank Smith
Robert W. Hampton
ATTORNEYS

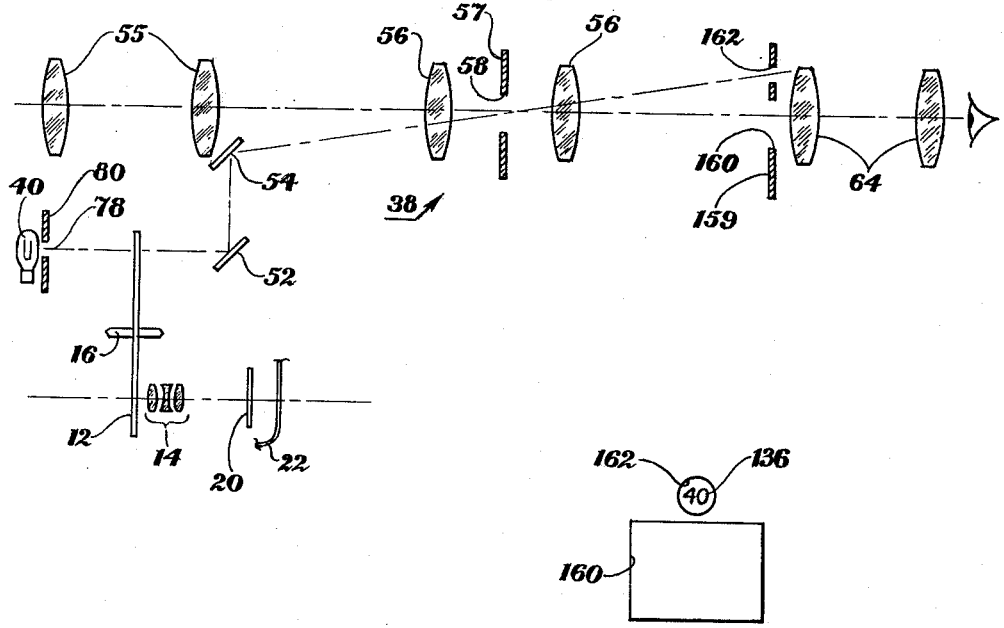
Fig. 5
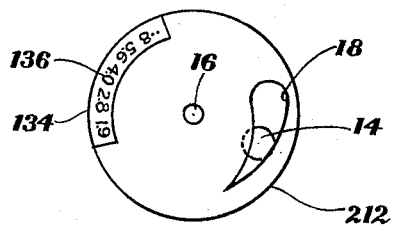
Fig. 6
Fig. 7
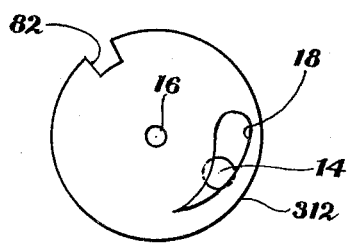
Fig. 8
Cameron B. Estes
INVENTOR.

United States Patent Office 3,106,141
Patented Oct. 8, 1963

3,106,141
VISUAL SIGNAL FOR PHOTOGRAPHIC CAMERAS
Cameron B. Estes, Rochester, N.Y., assignor to Eastman Kodak Company, Rochester, N.Y., a corporation of New Jersey
Filed Sept. 10, 1959, Ser. No. 839,104
7 Claims. (Cl. 95—10)

The present invention relates to photographic cameras having automatic exposure control systems, and more particularly relates to means for indicating low scene brightness in such cameras.

It is convenient for the operator of a motion picture camera, which has an automatic exposure control system, to be warned when scene brightness drops below the range for which the camera is designed. Numerous devices have been proposed for presenting a low-light signal to the camera operator in such cases. However, signals of this type generally have been illuminated by scene light, the intensity of which has diminished when the signal must be effective.

It is therefore a primary object of the present invention to warn the operator of a camera, which has an automatic exposure control system, when the scene brightness is less than a predetermined value, by means of a visual signal that does not depend on scene light for illumination.

It is a more particular object of the invention to energize an electric lamp in a camera to produce a visual signal for the camera operator when scene brightness is less than a predetermined value.

A further object of the invention is to control the energization of an electric lamp in a camera by means of an automatic exposure control system in such camera, for warning the camera operator of low scene brightness.

A further object of the invention is to display any of the foregoing signals in the viewfinder of a camera.

Another object of the invention is to present an artificially illuminated image of an aperture scale in the viewfinder of a camera having an automatic exposure control system and having means controlled by such system for moving the imaged scale or its pointer to correspond to scene brightness.

Other objects of the invention will appear from the following description, reference being made to the accompanying drawings, wherein:

FIG. 1 is a schematic right side view of the basic elements of a motion picture camera embodying one form of the present invention;

FIG. 2 is a front view of the diaphragm vane illustrated in FIG. 1;

FIG. 3 is the apparent view seen by the camera operator looking through the viewfinder of a camera provided with the invention in the form shown in FIGS. 1 and 2;

FIG. 4 illustrates an alternate means for energizing the indicator lamp;

FIG. 5 is a further embodiment of structure for presenting an image of an aperture scale in the viewfinder;

FIG. 6 is a front view of the diaphragm vane illustrated in FIG. 5;

FIG. 7 is the apparent view seen by the operator of a camera provided with the indicating structure shown in FIGS. 5 and 6; and FIG. 8 is a front view of a further form of diaphragm-vane indicating mechanism which may be employed as a part of the invention.

Referring to FIG. 1, a typical camera embodying the invention has a taking-lens axis 10 on which are arranged a taking-lens system indicated generally at 14, a diaphragm vane 12, a shutter 20 and a photosensitive surface such as a filmstrip 22. Referring also to FIG. 2 the diaphragm vane may be formed as a disk pivoted centrally on a shaft 16 and having a tapered, curved aperture 18, which moves in a path crossing the lens axis 10 for establishing an exposure aperture whose area is a function of the angular position of the diaphragm vane. The diaphragm vane may be positioned automatically, in a manner well known in the art, by means of a galvanometer coil 24, which is connected to and rotates the diaphragm shaft 16. Coil 24 cooperates with a permanent magnet core 26 and is connected by leads 28 and 30 to a photocell 32, which is exposed to scene light. Variations in scene brightness cause the coil 24 to be variably energized by photocell 32 and thereby cause the coil to move angularly about shaft 16 for establishing an angular position of the diaphragm vane 12 corresponding to scene brightness. The structure and operation of the galvanometer and photocell are well known in the art and may be of the type disclosed in U.S. Patent 2,509,-893, granted May 30, 1950 to C. F. Taylor et al.

Although the drawings illustrate a motion picture camera wherein the exposure is automatically controlled by positioning a diaphragm vane, it will be understood that the invention has equal utility in conjunction with other forms of automatic exposure control, e.g., in still or motion picture cameras wherein shutter speed is automatically controlled instead of or in addition to diaphragm opening.

Referring to FIG. 2, a transparent segment 34 set into the periphery of the vane 12 has signal control means in the form of an aperture scale 36, an image of which is transmitted into the viewfinder 38 (FIG. 1) of the camera in accordance with one form of the invention. The image of the aperture scale is artificially illuminated by an electric lamp 40 which is connected in circuit with a camera operating switch 42, a source of electrical potential, which is illustrated as a battery 44, and an electrically operated motor 46. This motor may be used for driving the film advance mechanism and the shutter mechanism in a manner well known in the art. When the camera operating switch 42 is closed, the drive motor 46 and lamp 40 are energized.

Light from lamp 40 passes through a diffuser 48, the aperture scale 36 and a relay lens 50. This light is reflected by a pair of mirrors 52 and 54 to a viewing locus, which is illustrated as a telescopic viewfinder 38 having an objective 55, a centrally disposed pair of erector lenses 56 separated by a diaphragm 57 having an aperture 58, a field stop 59 having a framing aperture 60 and a scale aperture 62, and an eyepiece 64. The scale image reflected from mirror 54 is transmitted through the erector lenses 56 and the aperture 58 of diaphragm 57 and rearwardly through the scale aperture 62 of the field stop 59 into the eyepiece 64. The scale image and field frame appear through the viewfinder as illustrated in FIG. 3.

In FIG. 4 there is illustrated a means for energizing the lamp 40 only when low scene brightness occurs. The camera operating switch 142 cooperates in this case with three contacts 66, 68 and 70. When switch 142 is closed the circuit for motor 46 is closed through contacts 66 and 68 and battery 44. A circuit for lamp 40 is partially completed through contacts 66 and 70, lamp 40, battery 44 and two contacts 72 and 74. A conducting arm 76, constituting a second form of signal control means, is secured to the diaphragm vane 112 for movement therewith. When the diaphragm vane moves to its maximum aperture position, which occurs when scene brightness drops to the lowest value within the range of the camera, arm 76 closes contacts 72 and 74 to complete the energizing circuit for lamp 40, which then is energized and may be employed for warning the camera operator of the low-light condition.

FIG. 5 illustrates an alternate embodiment of the structure shown in FIG. 1. In this embodiment, light from lamp 40 passes through a pinhole aperture 78 in a baffle plate 80, and passes through an aperture scale 136 (FIG. 6) in a transport arcuate segment 134 on the periphery of the diaphragm vane 212. The image of scale 136 is inverted because of the pinhole aperture and is reflected into the viewfinder by mirrors 52 and 54 in the same manner as described in relation to FIG. 1. In FIG. 5, the field stop 159 forward of the eyepiece 64 is provided with a rectangular field aperture 160 (see also FIG. 7) and with a small circular scale aperture 162, which displays only a single aperture value from the image of scale 136.

A further form of signal control means is shown in FIG. 8, wherein the diaphragm vane 212 is provided with a peripheral notch 82, which may be used to cooperate with the lamp such as 40 in FIGS. 1, 4 and 5. In this embodiment, there is no aperture scale on the diaphragm vane; instead, notch 82 merely permits light from the lamp to be transmitted into the viewfinder when a low-light condition exists and blocks such light at all other times. Obviously, the diaphragm vane may be provided with an ear rather than a notch, so that light will be excluded from the viewfinder only when the low-light condition exists.

This invention has been described in detail with particular reference to preferred embodiments thereof, but it will be understood that variations and modifications can be effected within the spirit and scope of the invention as described hereinabove and as defined in the appended claims.

I claim:

1. In a camera having an automatic exposure control system including a photocell and a member moved automatically under control of said photocell as a function of scene brightness to regulate the exposure of film in said camera, the combination comprising: means including an electric lamp and a source of electrical potential for said lamp for transmitting light to a viewing locus visible from the outside of the camera; and signal control means disposed in cooperative relation with said transmitting means and moved by said member in timed relation therewith for modifying the light transmitted to said locus in accordance with the position of said member.

2. The combination defined in claim 1, wherein said moving member comprises a diaphragm vane.

3. The combination defined in claim 1, wherein said transmitting means includes a normally open switch electrically in circuit with said source and said lamp, and said signal control means includes a device moved by said member for closing said switch in response to movement of said member to a predetermined position.

4. The combination defined in claim 1, wherein said signal control means comprises a scale device moving with said member and having areas of contrasting light transmission defining scale indicia, said scale device having a path of movement intersecting the light transmitted to said locus.

5. The combination defined in claim 4, with a diffuser interposed between said lamp and the path of said scale device.

6. The combination defined in claim 1, wherein said viewing locus comprises a viewfinder integral with said camera.

7. The combination defined in claim 6, wherein said viewfinder has a field stop defining a field frame and defining a signal aperture through which said light is transmitted rearwardly.

References Cited in the file of this patent

UNITED STATES PATENTS

| | | |
|---|---|---|
| 1,721,411 | Ramsey | July 16, 1929 |
| 2,026,675 | Edwards | Jan. 7, 1936 |
| 2,051,061 | Tonnies | Aug. 18, 1936 |
| 2,112,701 | Leitz | Mar. 29, 1938 |
| 2,242,043 | Sanger | May 13, 1941 |
| 2,297,262 | Tonnies | Sept. 29, 1942 |
| 2,649,017 | McCarty | Aug. 18, 1953 |
| 2,841,064 | Bagby | July 1, 1958 |
| 2,933,991 | Sauer | Apr. 26, 1960 |